United States Patent Office 3,523,328
Patented Aug. 11, 1970

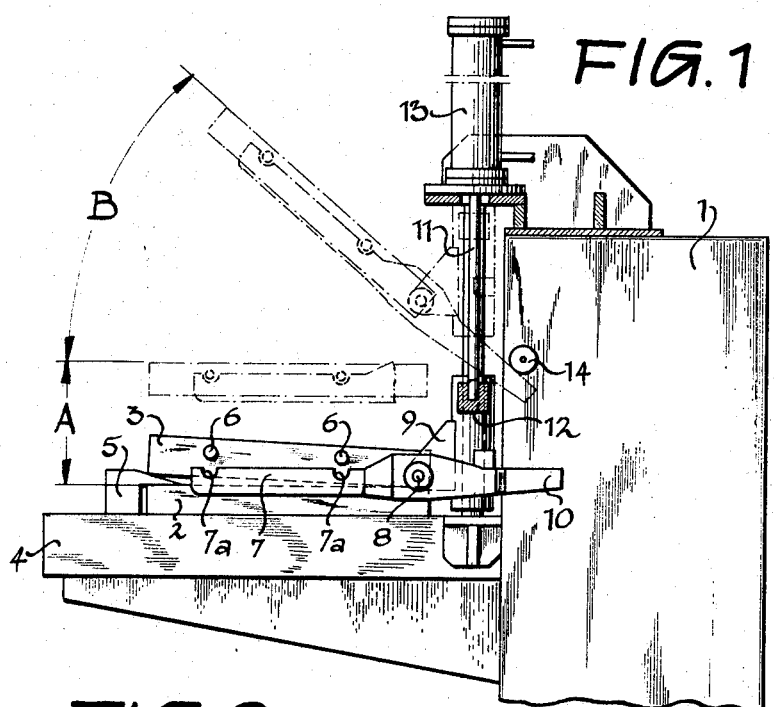
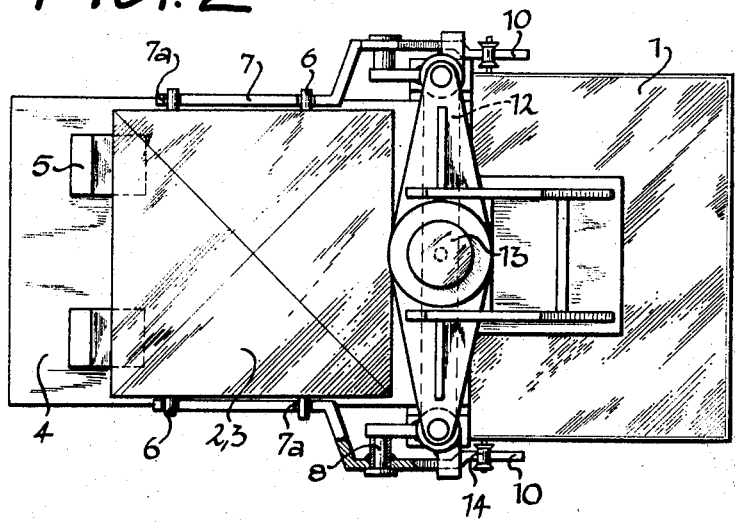
INVENTOR.
KARL HUFF
DIETER HOLM
HANS HUMKE

3,523,328
APPARATUS FOR OPENING VULCANIZING MOLDS, ESPECIALLY FOR USE IN CONNECTION WITH RUBBER INJECTION MOLDING MACHINES
Karl Huff and Dieter Holm, Ahlem, and Hans Humke, Havelse, Germany, assignors to Continental Gummi-Werke Aktiengesellschaft, Hannover, Germany
Filed Nov. 28, 1966, Ser. No. 597,355
Claims priority, application Germany, Nov. 30, 1965, C 37,526
Int. Cl. B29h 3/08
U.S. Cl. 18—2
10 Claims

ABSTRACT OF THE DISCLOSURE

A mold opening device having a power operable upward lifting means including combined vertical cylinder and vertically reciprocable piston system with a pair of two-arm levers and arm engaged abutments vertically spaced by approximately twice the thickness of the top plate means with respect to bottom plate means of a vulcanizing mold. Exclusive initial movement of said levers completely vertically must occur prior to any subsequent pivotal movement with respect to the abutment to assure against possible damage to a just-molded article during the subsequent pivotal movement of the top plate means at an angle of approximately 90° rotation, simultaneously freely exposing the mold parts for thorough inspection and cleaning.

---

The present invention relates to apparatus for opening vulcanizing molds with two or more plates, especially for use in connection with rubber injection molding machines, in which the upper and bottom plates are during the injection molding operation held together by a pressing device and in which said upper and bottom plates are separated from each other for removing the finished vulcanized article.

In connection with molds of the above mentioned type, is known to interconnect the mold plates by a kind of hinge joints, and it is also known for opening the mold to tilt the top plate upwardly in the manner of a lid. While in this way, the mold chambers are relatively easily accessible, molds of this type are limited to the molding of relatively flat or narrow articles. When molds are involved which have deep chambers as in the case for instance when producing cylindrical bushing bodies or bar-shaped articles, there exists the danger that when opening the mold, in view of the movement of the top plate along an arch, that the molded article is deformed or damaged. On the other hand, a straight vertical lifting of the top plate does not permit the desired view of the mold chamber so that the frequently necessary cleaning of the mold plates is impeded. In addition thereto, the limited lifting space of the movable press parts by themselves limit the conditions of space and possibility of movements for post-treating the vulcanizing molds.

It is, therefore, an object of the present invention to improve the above mentioned devices.

It is another object of this invention to provide a mold of the above mentioned general character which will greatly improve the possibilities of inspecting and cleaning the form plates and form chamber.

These and other objects and advantages of the present invention will appear more clearly from the following specification in connection with the accompanying drawing, in which:

FIG. 1 diagrammatically illustrates a side view, partially in section, of an apparatus according to the present invention.

FIG. 2 is a top view of the apparatus shown in FIG. 1.

The present invention is characterized primarily in that the top plate of the mold is first substantially vertically lifted from the bottom plate held outside the range of action of the pressing device, and is subsequently following a lifting movement which corresponds substantially to the maximum depth of the mold chambers in the mold plate, pivoted or tilted about a stationary point of rotation so as to form an obtuse angle with regard to the bottom plate. Thus, the present invention combines the desired straight lifting movement of the upper mold plate during the starting phase of the opening operation with the tilting movement similar to the opening of a book. In this way, optimum starting conditions are created for inspecting and cleaning the mold plates while the sensitive formed article will remain undamaged. By transferring the opening cycle to a place outside the range of action of the pressing device, the limitaiton as to space heretofore accepted will no longer have to be put up with, and it is possible to tilt the top plate upwardly relative to the bottom plate at an angle of approximately 90°. Under these conditions, the opened mold parts are freely exposed and can be thoroughly inspected and also be cleaned from residues.

The apparatus according to the invention advantageously comprises a support arranged outside the range of action of the pressing device. It is upon this support that the mold after completed vulcanization and after leaving the pressing device is placed and on which it can be fixed against the opening resistance to be applied. Starting from these conditions, it is a feature of the present invention to provide a two-arm lever which is turnably connected to a lifting means for instance in the form of a fluid operable cylinder piston system. One arm of said two-arm lever serves for receiving the mold upper plate, whereas the free lever arm is adapted to engage a stationary abutment. The lever may be arranged above the mold approximately along the axis of symmetry thereof. Preferably, however, said lever is arranged in pairs on two longitudinal sides of the mold upper plate so that no harmful turning of moments can be initiated with the breaking loose and lifting off of the top plate. The employment of pressure fluid cylinder piston means for producing the lift forces yields a particularly simple construction which can easily be observed and has the advantage over magnetic valves of controlling the fluid medium in a particularly simple manner. By means of limit switches, the opening operation can be incorporated in an automatic program sequence.

Referring now to the drawing in detail, the apparatus according to the invention is shown as a part of an injection molding machine for producing articles of rubber and rubber-like mixtures, said apparatus being associated with a pressing device 1. The vulcanizing mold comprising a bottom plate 2 and a top plate 3 is during the injection operation proper located within the pressing device 1 where the mold while being heated is held together by outer clamping forces, said mold being charged with a rubber filling which is injected by a heated displaceable injection cylinder. The construction and operation of the pressing device 1 as well as the injection molding device do not form a part of the invention proper and, therefore, a further description thereof does not appear to be necessary. That side of the pressing device which faces away from the injection molding device is followed by a receiving and opening device which in conformity with the showing in the drawing comprises a table-shaped support 4 for the mold 2, 3. After completed vulcanization, the mold is manually or mechanically removed from the opened pressing device 1 and placed onto the support 4, the bottom plate 2 being held down by sliding guiding means (not illustrated). For purposes of facilitating the opening operation, the support 4 may be provided with wedge-shaped extensions 5 which are so arranged that the tip of said extensions 5 will engage the dividing plane between the two mold plates 2 and 3 as shown in FIG. 1 and will be able to break the two mold plates 2, 3 apart by engaging a notch which opens toward the outside.

The top plate 3 has two oppositely located sides thereof provided with a pair of studs 6 intended for positively engaging similarly shaped recesses 7a in two levers 7, the studs 6 and recesses 7a forming separable interengageable elements to connect the top plate to the levers. Levers 7 are by means of pivots 8 tiltably journalled on vertically movable guiding means 9 and extend beyond said pivot in the direction toward the pressing device 1 where they are provided with extensions 10. The guiding means 9 are interconnected through the intervention of a traverse 12 and together with the piston rod 11 are connected to a pressure fluid cylinder 13 fixedly connected to the pressing device 1. At both sides of the pressing device, rollers 14 are inserted in the path through which the extensions 10 of levers 7 move so that said rollers form fixed abutments for said extensions 10.

The operation of the device is as follows. It may be assumed that after completed vulcanization the mold has been pulled out of the pressing device and placed upon the support 4 so that the opening operation may be initiated. This starting position is shown in the drawing. The bottom plate 2 of the mold is clamped against support 4 so that it will not lift itself off from said support. The wedge-shaped extensions 5 bring about the first phase of the breaking loose of the mold parts. Piston rod 11 of cylinder 13 occupies its lowermost end position so that levers 7 extend horizontally below studs 6 on top plate 3 and will not affect the displacement of the mold.

By introducing a pressure fluid medium into the lower working chamber of the cylinder 13, piston rod 11 together with the traverse 12 moves upwardly. During the initial phase of this upward movement, studs 6 are engaged by the corresponding recesses 7a of levers 7, whereas during the further upward movement, the top plate 3 of the mold is lifted off from the bottom plate 2 and is moved upwardly in the direction of the arrow A. After a certain partial stroke has been carried out, the lever extensions 10 abut the stationary rollers 14. These rollers are arranged at such a level above the dividing plane of the mold plates 2 and 3 that at the instant of establishing contact, the molded articles will safely free themselves from the mold nests of the respective mold plate. With the movement of the extensions 14 along the rollers, the said vertical movement of levers 7 with the top plate 3 thereon changes to a curved tilting movement along the direction indicated by the arrow B which tilting movement ends when the very position indicated in dash lines has been reached.

The thus obtained opening position of the top plate 3 with regard to the bottom plate 2 permits the withdrawal of the finish vulcanized rubber article without difficulties and at the same time permits the inspection of the mold nests of both mold plates which is necessary for the subsequent cleaning of the mold. The design of the stationary abutments in the form of rotatably journalled rollers 14 reduces the friction at the lever portions 10 during the tilting movement.

For closing the mold by reversing the supply of pressure fluid to the cylinder piston systems 11, 13, the top plate 3 will be lowered onto the bottom plate whereupon the entire mold is returned into the pressing device 1 for initiating the next injection cycle.

It is, of course, to be understood that the present invention is, by no means, limited to the particular construction shown in the drawing but also comprises any modifications within the scope of the appended claims.

What we claim is:

1. For use in connection with a mold having top and bottom plate means and with a rubber injection molding machine having a pressing device for holding the mold closed during the injection operation, a mold opening device, which includes: supporting means extending outwardly from said pressing device and entirely outside the range of operation of said pressing device for receiving and holding said mold, power operable upward lifting means, lever means pivotally connected to said lifting means extending outwardly from said lifting means adjacent said supporting means and entirely outside of said pressing device and movable by said lifting means upwardly and downwardly only for respectively lifting said top plate means off said bottom plate means and placing said top plate means thereon, said lever means including a first arm engaging and raising the top plate of said mold when said mold is on said supporting means upon upward movement of said lifting means, a second arm on the opposite side of the pivotal connection, and abutment means arranged in the path of movement of said second arm above and in vertically spaced relationship to said second arm prior to the opening of said mold, whereby after said lever means is moved upwardly vertically until said shorter arm abuts said abutment means, said lever means and said top plate means carried thereby are pivoted angularly about said abutment means.

2. A mold opening device according to claim 1, in which said vertically movable lever means comprises a pair of two-arm levers arranged on two opposite sides of said top plate means for engagement therewith.

3. A device according to claim 2, in which said pair of two-arm levers are interconnected by means extending transverse to the longitudinal extension of said levers and connected directly to said upward lifting means.

4. A device according to claim 1, in which said power operable upward lifting means includes a fluid pressure operable vertical cylinder and vertically reciprocable piston system.

5. A device according to claim 1, in which said vertical abutment means is formed by a roller rotatable about a stationary axis of said pressing device.

6. Apparatus for producing rubbery articles by injection of flowable pre-warmed rubbery mixture under elevated pressure in a heated vulcanizing mold including cooperable top and bottom plate means adapted to be kept closed by a pressing device in combination, comprising: supporting means entirely outside said pressing device for supporting said mold when removed from said pressing device, a mold opening means including a rigid support extending in a vertical direction exclusively with respect to the bottom plate means entirely beyond effective range of the pressing device and adjacent said supporting means, interconnected carrier arms outside said pressing device and positioned adjacent said supporting means and engageable with the top plate means upon vertical movement on at least two opposite sides thereof, and vertically movable power stroke means operable upon said carrier arms for initial movement thereof with respect to said support exclusively in vertical direction to raise said top plate means vertically and only then followed by angular pivotal movement of the top plate means with respect to the bottom plate means.

7. Apparatus in combination according to claim 6, in which said power stroke means includes a pressure medium operating cylinder having therein an exclusively vertically reciprocable piston with a piston rod joined to said interconnected carrier arms.

8. Apparatus in combination according to claim 6, in which pivot-forming fixed abutments are provided with said support and are engageable by said interconnected carrier arms only upon completion exclusively of vertical movement of the top plate means.

9. A device according to claim 2, in which said levers and top mold plate have separable interengageable elements which engage to connect the levers to said top plate upon vertical movement of said levers when said mold is on said supporting means.

10. Apparatus according to claim 6, in which said carrier arms are positioned along said supporting means and below the top plate of said mold when on said supporting means, said arms being moved vertically to engage the top plate first and then move said top plate vertically.

References Cited

UNITED STATES PATENTS

| | | |
|---|---|---|
| 2,531,048 | 11/1947 | Kilborn. |
| 2,792,592 | 5/1957 | McGee. |
| 2,859,477 | 11/1958 | Milhoff. |
| 2,923,976 | 2/1960 | Strauss. |
| 2,972,776 | 2/1961 | Siegrist. |
| 3,000,429 | 9/1961 | Warnken. |
| 3,161,911 | 12/1964 | Mathews. |
| 3,205,551 | 9/1965 | Neubauer et al. |
| 2,692,407 | 10/1954 | Stacy. |
| 2,958,897 | 11/1960 | Milhoff. |
| 2,993,231 | 7/1961 | Yahn et al. |
| 3,121,918 | 2/1964 | Jurgeleit. |
| 3,337,909 | 8/1967 | Loges et al. |

FOREIGN PATENTS

| | | |
|---|---|---|
| 1,165,247 | 3/1964 | Germany. |

J. HOWARD FLINT, Jr., Primary Examiner

U.S. Cl. X.R.

264—334; 18—16, 17